Patented Apr. 15, 1947

2,418,851

UNITED STATES PATENT OFFICE 2,418,851

METHOD OF OXIDIZING SULFUR DIOXIDE TO SULFUR TRIOXIDE

Edgar F. Rosenblatt, East Orange, and Louis Pollen, Unionville, N. J., assignors to Baker & Company, Inc., Newark, N. J., a corporation of New Jersey No Drawing. Application May 23, 1942, Serial No. 444,266

4 Claims. (Cl. 23—175)

1

This invention relates generally to catalytic processes and is concerned with the oxidation of sulphur dioxide to sulphur trioxide in the contact process of manufacturing sulphuric acid, wherein sulphur dioxide is contacted with oxygen, as contained for instance in air or other gaseous medium, at elevated temperature in the presence of a catalyst to produce sulphur trioxide. More specifically, the invention deals with the catalytic oxidation of $SO_2$ to $SO_3$ by means of a supported platinum metal catalyst.

Catalysts embodying platinum metals as catalytically active material comprise two broad groups. In one group the catalyst consists of the platinum metal in the form of wire or powder, as for instance in the form of wire gauze, and in the other group the catalyst consists of a support carrying platinum metal on its surface in one form or another. Catalysts of the former group are not suitable for the production of sulphuric acid by the contact process, and all catalysts for the oxidation of $SO_2$ to $SO_3$ in the contact process of manufacturing sulphuric acid, therefore, consist of the supported type of catalyst. While the employment of supported catalysts embodying as catalyst metal a metal of the platinum group other than platinum itself is known, no practical use of such catalysts has been made in the oxidation of $SO_2$ to $SO_3$ so that such catalysts for the manufacture of sulphuric acid have been limited in practice to supported platinum catalysts.

Efforts have been made to increase the activity and performance of supported platinum catalysts by associating with the catalyst other substances such as base metal compounds serving as promoters or the like or by improving the methods of depositing the catalytic platinum on the support.

We have found, however, that the catalytic activity of such supported catalysts for the oxidation of $SO_2$ to $SO_3$ can be improved substantially by depositing on supports platinum in association with palladium.

The improved catalytic efficiency and performance in the oxidation of $SO_2$ to $SO_3$ of such supported catalysts, comprising a combination of platinum and palladium, is particularly surprising in that palladium as such when deposited on a carrier has no catalytic activity in the oxidation of $SO_2$ to $SO_3$ in the temperature range of sulphuric acid plant operations.

The carrier of the catalyst according to this invention may comprise any suitable material such as aluminum oxide, magnesium sulphate, silica gel, asbestos, etc. The metals platinum and palladium may be deposited on the carrier in any suitable manner as, for instance, by dissolving compounds thereof in a solvent, aqueous or organic, bringing the carrier and the solvent in contact, and decomposing such compounds by reducing agents or under heat. The deposition of platinum and palladium in such manner may take place by depositing first one metal and then another, although simultaneous deposition thereof from one solvent is to be preferred. The platinum and palladium are deposited in a thorough combination, the exact nature of which has not been ascertained as to whether such combination represents a mixture or an alloy of such metals or a mixture of metal and oxide, although from the appearance of the catalyst and the general chemical behavior of the metals it appears probable that at least a large part of the palladium is present in the form of an oxide thereof whereas the platinum is largely present in metallic form.

The increased catalytic efficiency of the catalysts according to this invention will be apparent from the specific examples which we are about to give, the metal or metals being deposited in a uniform layer on the surface of a carrier. In all cases the catalyst metal was deposited in like manner by employing the method more particularly described in our co-pending application Serial No. 438,568 filed April 11, 1942, whereby a compound of platinum and palladium is dissolved in an organic solvent of low volatility such as fish oil or the like, and the catalyst metal is deposited on the carrier by decomposition of the compounds under heat. In the examples the supports consist of magnesium sulphate and aluminum oxide pellets, respectively.

Table

| Catalyst Metal Composition | | Catalyst Metal per cent by wt. on support | Support | Catalyst Chamber Temperature, °C. | | | Per cent Conversion $SO_2$ to $SO_3$ |
|---|---|---|---|---|---|---|---|
| Per cent Pt | Per cent Pd | | | Entrance Temp. | Maximum Temp. | Exit Temp. | |
| ---------- | 100 | 0.33 | $MgSO_4$ | 315 | 340 | 339 | None |
| ---------- | 100 | 0.33 | ...do..... | 395 | 401 | 395 | Trace |
| 100 | ---------- | 0.30 | ...do..... | 310 | 490 | 450 | 92.5 |
| 90 | 10 | 0.30 | ...do..... | 304 | 496 | 439 | 93.5 |
| 75 | 25 | 0.30 | ...do..... | 306 | 472 | 432 | 95.9 |
| 50 | 50 | 0.30 | ...do..... | 312 | 479 | 446 | 93.9 |
| 65 | 35 | 0.30 | ...do..... | 311 | 477 | 413 | 95.3 |
| 75 | 25 | 0.60 | $Al_2O_3$ | 305 | 489 | 406 | 97.2 |
| 65 | 35 | 0.60 | ...do..... | 301 | 481 | 409 | 96.7 |
| 25 | 75 | 0.60 | ...do..... | 330 | 498 | 482 | 88.1 |
| 10 | 90 | 0.60 | ...do..... | 329 | 501 | 500 | 78.8 |

The above table is intended to merely give a few representative experiments serving to illustrate the increase in efficiency produced by combining platinum with palladium in the production of supported catalysts for the oxidation of $SO_2$ to $SO_3$. The exact ratio of platinum to palladium does not appear to be generally critical for the production of supported catalysts according to this invention, in that even small quantities of palladium, such as below 10%, have a favorable effect on the conversion efficiency and in that even large quantities of palladium such as in excess of 50% palladium may be utilized for the production of favorable results. Catalysts relatively rich in palladium, such as catalysts containing substantially more than 50% palladium, are however inferior in conversion efficiency to catalysts relatively rich in platinum. Palladium is considerably less expensive than platinum so that the production of a highly active supported catalyst embodying palladium is not only advantageous from a conversion point of view but also from a cost point of view. While, therefore, catalysts containing small quantities of palladium as well as catalysts containing large quantities of palladium furnish advantageous results, we have found that from the point of view of plant operations the most advantageous catalyst comprises from about 10% to about 50% palladium relative to about 90% to about 50% platinum and we recommend in particular catalysts comprising from about 20% to about 40% palladium relative to from about 80% to about 60% platinum.

In the experiments above reported the catalysts were tested in an adiabetic catalyst chamber corresponding to the first converter of a two-converter system in the oxidation of $SO_2$ to $SO_3$; the gas mixture contained 8% $SO_2$ and was passed through the catalyst bed with a velocity of 6000 volumes of gas mixture at 0° C. and 760 mm. Hg pressure per volume of catalyst per hour.

What we claim is:

1. The method of oxidizing sulphur dioxide to sulphur trioxide, comprising reacting sulphur dioxide and oxygen at reaction temperatures in the presence of a supported catalyst comprising a carrier having deposited thereon a thin layer of platinum and palladium containing from about 50% to 90% platinum and from about 10% to 50% palladium.

2. The method of oxidizing sulphur dioxide to sulphur trioxide, comprising reacting sulphur dioxide and oxygen at reaction temperatures in the presence of a supported catalyst comprising a carrier having deposited thereon a thin layer of platinum and palladium containing from about 60% to 80% platinum and from about 20% to 40% palladium.

3. The method according to claim 1 wherein the carrier of the supported catalyst consists of magnesium sulphate 4. The method according to claim 1 wherein the carrier of the supported catalyst consists of aluminum oxide.

EDGAR F. ROSENBLATT.
LOUIS POLLEN.

REFERENCES CITED

The following references are of record in the file of this patent:

UNITED STATES PATENTS

| Number | Name | Date |
|---|---|---|
| 2,076,953 | Lacy | Apr. 13, 1937 |
| 1,314,952 | Ellis | Sept. 2, 1919 |
| 2,330,664 | Bennett | Sept. 28, 1943 |
| 657,004 | Pierron | Aug. 8, 1900 |

FOREIGN PATENTS

| Number | Country | Date |
|---|---|---|
| 354,500 | British | Aug. 13, 1931 |
| 6,448 | British | 1905 |
| 440,358 | German | Feb. 16, 1926 |

OTHER REFERENCES

"Mf'g of Acids and Alkalies," Lunge and Cunnings, vol. IV, Mf'g of sulfuric acid (contact process) Miles page 123. (Copy in Div. 59.)